United States Patent
Szabó et al.

(10) Patent No.: US 8,892,884 B2
(45) Date of Patent: Nov. 18, 2014

(54) MANAGING IPSEC SECURITY ASSOCIATIONS USING DISCRETE DOMAINS

(75) Inventors: Gergely Szabó, Budapest (HU); Péter Tömör, Mougins le Haut (FR)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 105 days.

(21) Appl. No.: 13/505,644

(22) PCT Filed: Nov. 10, 2009

(86) PCT No.: PCT/EP2009/064904
§ 371 (c)(1),
(2), (4) Date: Aug. 16, 2012

(87) PCT Pub. No.: WO2011/057658
PCT Pub. Date: May 19, 2011

(65) Prior Publication Data
US 2012/0303955 A1    Nov. 29, 2012

(51) Int. Cl.
*H04L 29/06* (2006.01)

(52) U.S. Cl.
CPC ............... *H04L 63/06* (2013.01); *H04L 63/08* (2013.01); *H04L 63/164* (2013.01); *H04L 63/0485* (2013.01)
USPC ............................................. 713/168; 709/225

(58) Field of Classification Search
CPC ................................ H04L 63/0485; H04L 63/08
USPC ............................................................. 713/168
See application file for complete search history.

(56) References Cited

U.S. PATENT DOCUMENTS

| 5,983,350 | A * | 11/1999 | Minear et al. .................. 726/11 |
| 7,945,666 | B2 * | 5/2011 | Wunner ...................... 709/225 |
| 2003/0061507 | A1 * | 3/2003 | Xiong et al. .................. 713/201 |
| 2004/0098600 | A1 * | 5/2004 | Eldeeb .......................... 713/189 |
| 2006/0095768 | A1 * | 5/2006 | Hoshino et al. ................ 713/168 |
| 2008/0240432 | A1 * | 10/2008 | Belgaied et al. .............. 380/255 |
| 2009/0041006 | A1 * | 2/2009 | Chiu .............................. 370/352 |
| 2011/0023090 | A1 * | 1/2011 | Asati et al. ....................... 726/4 |

OTHER PUBLICATIONS

Sun, H-M. et al. "The Design and Implementation of IPSec Conflict Avoiding and Recovering System." TENCON 2007—2007 IEEE Region 10 Conference, Oct. 30-Nov. 2, 2007, pp. 1-4.
Yin, H. et al. "Building an Application-Aware IPsec Policy System." IEEE/ACM Transactions on Networking, vol. 15, No. 6, Dec. 2007, pp. 1502-1513.
McDonald, D. et al. "PF_Key Key Management API, Version 2." draft-mcdonald-pf-key-v2-06.txt, IETF Standard-Working-Draft, Internet Engineering Task Force, No. 6, Jul. 1998, pp. 1-61.

* cited by examiner

*Primary Examiner* — Hadi Armouche
*Assistant Examiner* — Bryan Wright
(74) *Attorney, Agent, or Firm* — Coats & Bennett, PLLC

(57) ABSTRACT

A method and system for managing IPsec Security Associations in a Security Association Database (SADB) in an IP network is described. At a key management application, a domain extension header is inserted into a PF_KEY message containing instructions to a key engine unit. The domain extension header identifies a domain within the Security Association Database. The PF_KEY message is sent to the key engine unit, which carries out the instructions only for Security Associations in the domain of the Security Association Database indicated by the domain extension header.

16 Claims, 4 Drawing Sheets

MANAGING IPSEC SECURITY ASSOCIATIONS USING DISCRETE DOMAINS

TECHNICAL FIELD

The invention relates to a method and system for managing Security Associations (SAs).

BACKGROUND

Internet Protocol Security (IPsec) is a protocol suite for securing Internet Protocol (IP) communications by authenticating and encrypting each IP packet of a data stream. IPsec also includes protocols for establishing mutual authentication between agents at the beginning of a session, and negotiation of cryptographic keys to be used during the session. IPsec can be used to protect data flows between a pair of hosts (e.g. computer users or servers), between a pair of security gateways (e.g. routers or firewalls), or between a security gateway and a host.

IPsec uses the concept of a Security Association (SA) as the basis for building security functions into IP. A Security Association can be seen as a set of security information relating to a given network connection or set of connections, as described in RFC 2401 "Security Architecture for the Internet Protocol" (November 1998).) In general, a Security Association is simply the bundle of algorithms and parameters (such as keys) that is used to encrypt and authenticate a particular flow in one direction. Therefore, in normal bi-directional traffic, the flows are secured by a pair of Security Associations. The actual choice of encryption and authentication algorithms (from a defined list) is left to the IPsec administrator. Security Associations are stored in a Security Association Database (SADB). The SADB is part of the a key engine unit that is typically implemented in the kernel of an operating system.

In order to decide what protection is to be provided for an outgoing packet, IPsec uses the Security Parameter Index (SPI), an index to the SADB, along with the destination address in a packet header, which together uniquely identify a Security Association for that packet. A similar procedure is performed for an incoming packet, where IPsec gathers decryption and verification keys from the SADB.

The PF_KEY API version 2, described in RFC 2367 "PF_KEY Management API, Version 2" (July 1998), is a generic Application Interface (API) that provides an interface between the key kengine unit and trusted key management applications. PF_KEY is a message based socket protocol that can be extended with new proprietary messages. The existing messages can be extended with new parameters that are realized by extension headers.

The PF_KEY API provides key management applications with an interface for numerous operations like adding, listing or deleting SA associations. Furthermore, the key kengine unit can notify the key management applications about certain events. This is described in more detail in RFC 2367, but important operations include the following:

SADB_ADD is used by key management applications to insert SAs into the SADB.

SADB_GETSPI is used to insert a placeholder for an SA in the SADB, when the details are not yet known.

SADB_UPDATE is used to update existing SAs or placeholders previously inserted using SADB_ADD or SADB_GETSPI.

SADB_FLUSH is used to delete all the entries in the SADB.

SADB_DUMP can be used for dumping all entries in the SADB. It is mainly used for testing or debugging reasons and key management applications do not depend on this message for basic operation.

RFC 2367 stipulates that only trusted privileged key management applications are permitted to open PF_KEY sockets. However, the PF_KEY socket protocol does not differentiate between different key management applications. If the PF_KEY API is in use by more than one key management application, it can easily happen that an operation by one key management application has unwanted impacts on the Security Associations inserted by other key management applications.

For example, one key management application can empty the whole SADB using the SADB_FLUSH PF_KEY message. This can have undesired effects on other key management applications, since their Security Associations will be deleted. The PF_KEY socket protocol does not include a message that removes only those Security Associations that were inserted by a given key management application.

SUMMARY

It is an object of the invention to provide a mechanism to enable a particular key management application to retain control of the SAs inserted by that application. It is a further object to prevent the accidental deletion by one application of SAs inserted by another key management application.

In accordance with one aspect of the invention there is provided a key engine unit for managing IPsec Security Associations in an IP network. The key engine unit comprises a receiver for receiving a PF_KEY message from a key management application in the network. A storage medium is provided for storing Security Associations in a Security Association Database. The database is partitioned into discrete domains. The key engine unit also comprises a transmitter for sending a response message to the key management application. A Security Association control is operatively connected to the receiver, transmitter and storage medium. The Security Association control is arranged to determine whether the received PF_KEY message contains a domain extension header. If so, the domain extension header is used to identify a domain in the Security Association Database and apply instructions contained in the PF_KEY message to the identified domain. It will be appreciated that the Security Association control may comprise a single processor, or may be any arrangement associated with the key engine unit that is suitable for carrying out the actions described, for example hardware circuits or one or more microcontrollers adapted to run a microcontroller computer program as disclosed further down. The Security Association control may be implemented via hardware, although it will be appreciated that the Security Association control may also comprise a processing unit operating a computer program which, when run on a processing unit, causes the processing unit to carry out the required actions. Similarly, the receiver and transmitter may be implemented as hardware or by software run on a processing unit. A memory may therefore be associated with the or each processing unit, the memory containing a computer program which when run on the processing unit causes the processing unit to carry out these actions.

Certain PF_KEY messages (SADB_ADD, SADB_UPDATE, SADB_DUMP and SADB_FLUSH messages) may be modified to comprise the domain extension header.

The key engine unit may comprise a common domain. If the domain extension header is absent from the received PF_KEY message (if, for example, it has come from a legacy key management application), the Security Association control may apply the instructions comprised in the PF_KEY message to the common domain.

If the received PF_KEY message is a SADB_ADD or SADB_UPDATE message comprising a new or updated Security Association, then in accordance with one embodiment the Security Association control is arranged to store the new or updated Security Association in the domain of the SADB identified in the domain extension header, or in the common domain if the domain extension header is absent from the PF_KEY message.

It may be that the domain extension header comprises a domain identifier indicating all of the domains in the Security Association Database. If this is the case (and the received message is a SADB_ADD or SADB_UPDATE message), then in accordance with one embodiment the Security Association control is arranged to instruct the transmitter to return an error message towards the key management application without storing the Security Association in the SADB.

If the received PF_KEY message is a SADB_FLUSH message, then in accordance with one embodiment the Security Association control is arranged to delete all Security Associations in the domain of the Security Association Database identified in the domain extension header, or in the common domain if the domain extension header is absent from the PF_KEY message.

If the received PF_KEY message is a SADB_DUMP message, then in accordance with one embodiment the Security Association control is arranged to cause the transmitter to sent towards the key management application all Security Associations in the domain of the Security Association Database identified in the domain extension header, or in the common domain if the domain extension header is absent from the PF_KEY message.

If the domain extension header in the PF_KEY message contains a domain identifier indicating all of the domains in the Security Association Database (and the message is an SADB_FLUSH or SADB_DUMP message), then in accordance with one embodiment the Security Association control is arranged to carry out the instruction contained in the PF_KEY message for all domains in the Security Association Database.

Each domain in the SADB may be used to store the Security Associations for a single key management application.

In accordance with another aspect of the invention there is provided a method of managing IPsec Security Associations in a Security Association Database maintained by a key engine unit in an IP network. A PF_KEY message from a key management application in the network is received at the key engine unit. The PF_KEY message comprises instructions to the key engine unit and a domain extension header identifying a domain within the Security Association Database. The instructions contained in the PF_KEY message for are carried out for Security Associations in the domain of the Security Association Database indicated by the domain extension header.

If the PF_KEY message is a SADB_ADD or SADB_UPDATE message with a new or updated Security Association included in the PF_KEY message, then the Security Association is inserted into the Security Association database in the domain indicated by the domain extension header.

If the PF_KEY message is a SADB_FLUSH or SADB_DUMP message, then all Security Associations contained in the domain indicated by the domain extension header are deleted or returned to the key management application.

The method may further comprise inserting the domain extension header into the PF_KEY message at the key management application.

In accordance with a further aspect of the invention there is provided a computer program, comprising computer readable code which, when run on a key engine unit, causes the key engine unit to operate as described above.

In accordance with a further aspect of the invention there is provided a computer program, comprising computer readable code which, when run by a key engine unit, causes the key engine unit to perform a method as described above.

In accordance with a further aspect of the invention there is provided a computer program product comprising a computer readable medium and a computer program as described above, wherein the computer program is stored on the computer readable medium.

DETAILED DESCRIPTION

In order to control the Security Associations inserted by particular key management applications, the SADB is divided into several domains. The Security Association structure stored in the SADB is therefore modified. Each key management application can have its own domain. A common domain can be defined for backwards compatibility. Legacy key management applications that do not implement this function may automatically use this common domain.

Each domain has a unique domain ID (identity) assigned to it. A virtual domain ID can also be used to refer to every domain in the system. In the following discussion this is referred to as DOMAIN_ALL. The domain ID will be identified by a new extension header inserted into certain PF_KEY messages.

The sadb_x_domain Extension Header

A PF_KEY message consists of a base message header and several extension headers. The base message header specifies the type of the message (SADB_ADD, SADB_UPDATE, etc.) and the extension headers specify the parameters of the message (Security Association, SPI, etc.). Extension headers are termed sadb_x_parameter by convention, where "parameter" identifies the parameter being specified.

In order to correlate SAs with their correct domains, the new extension header is included in some PF_KEY messages. The new extension header is hereinafter referred to as sadb_x_domain in line with the convention just described. It can be optionally part of the following PF_KEY messages:

SADB_ADD
SADB_UPDATE
SADB_FLUSH
SADB_DUMP

Figure 1:
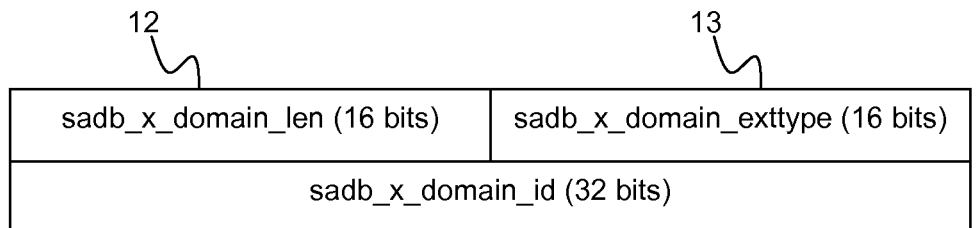
FIG. 1 is an illustration of the format of a sadb_x_domain extension header.

The format of a sadb_x_domain extension header 10 is shown in FIG. 1. A sadb_x_domain_id field 11 contains an identifier of the domain to be used in the SADB. Each domain has its own unique domain ID. The header also contains a sadb_x_domain_len field 12 which contains the length of the extension header in 64 bit words, and which will always be set to 1. A sadb_x_domain_exttype field 13 defines the type of extension header which follows (i.e. this field will tell a key engine unit that this extension header is of type sadb_x_domain).

For legacy key management applications, it will be appreciated that no sadb_x_domain extension header will be inserted into PF_KEY messages. When such messages are used to insert Security Associations into the SADB, the Security Associations are inserted into a "common domain". Subsequent PF_KEY messages which do not include a sadb_x_domain extension header will have an effect only on Security Associations stored in the common domain.

In some situations it may be desirable to assign a separate domain to each key management application. In such situations a unique application or process ID can serve as the domain ID. The common domain ID in that case can be the 0 value.

Figure 2:
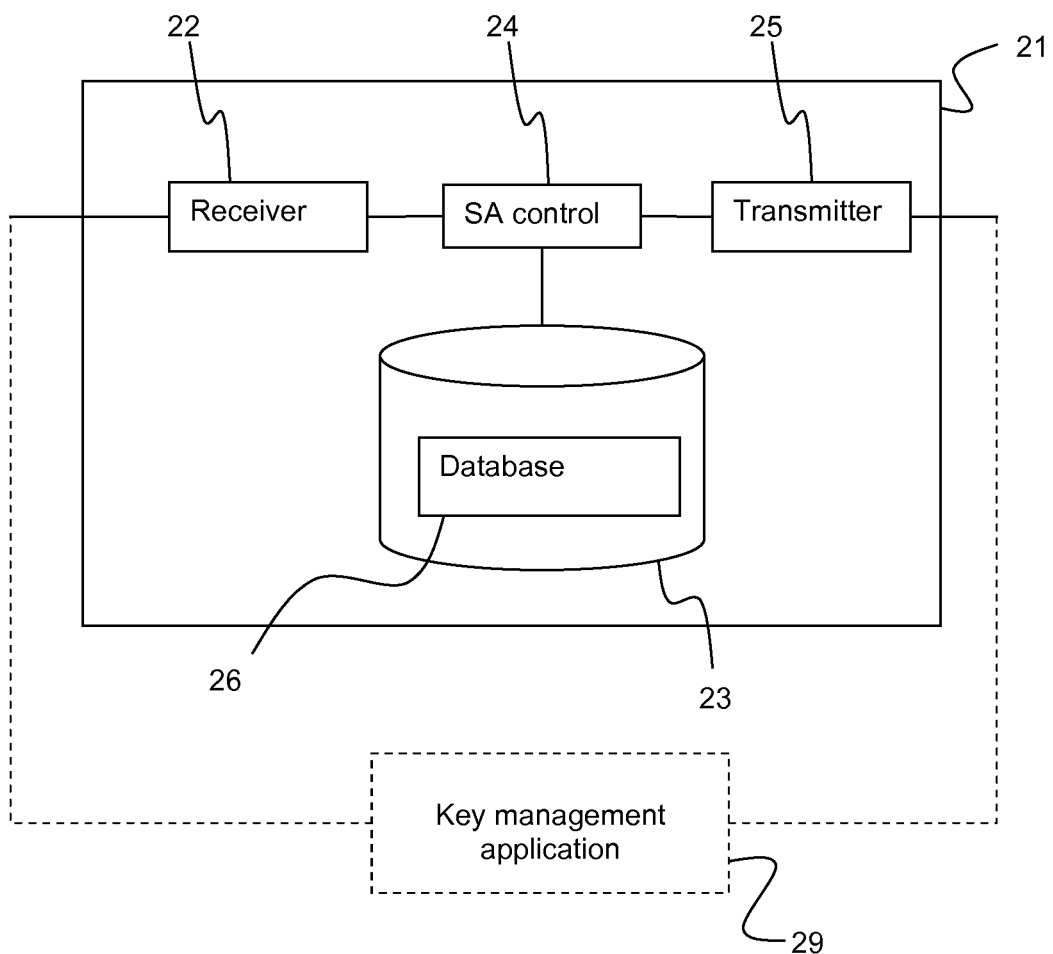
FIG. 2 is a schematic illustration of the architecture of a key engine unit for managing Security Associations.

FIG. 2 is an illustration of a key engine unit 21 in a network which manages Security Associations. The unit includes a receiver 22 for receiving PF_KEY messages from key management applications in the network (illustrated in this example by a key management application 29), and a storage medium 23 on which Security Associations are stored in a SADB 26 separated into domains. The storage medium could be e.g. a RAM (Random-access Memory), a ROM (read-only memory) a harddisk, a flash memory or an EEPROM (Electrically Erasable Programmable ROM). Alternatively, the storage medium 23 could be distributed over several processors, with each processor storing the data in its system memory (RAM). This would enable the provision of a distributed SADB 26. A Security Association control module 24 recognises a sadb_x_domain extension header in incoming PF_KEY messages and ensures that they are applied to Security Associations stored in the correct domain in the SADB. A transmitter 25 sends messages back to the key management applications 29. It will be appreciated that the Security Association control module 24 may comprise a single processor, or may be any arrangement associated with the key engine unit 21 that is suitable for carrying out the actions described. One or more individual processors may be used to implement the Security Association control module 24, and it is also conceivable that the receiver 22, transmitter 25 and Security Association control unit 24 may be incorporated together or in any combination in one (or more) circuit.

Figure 3:
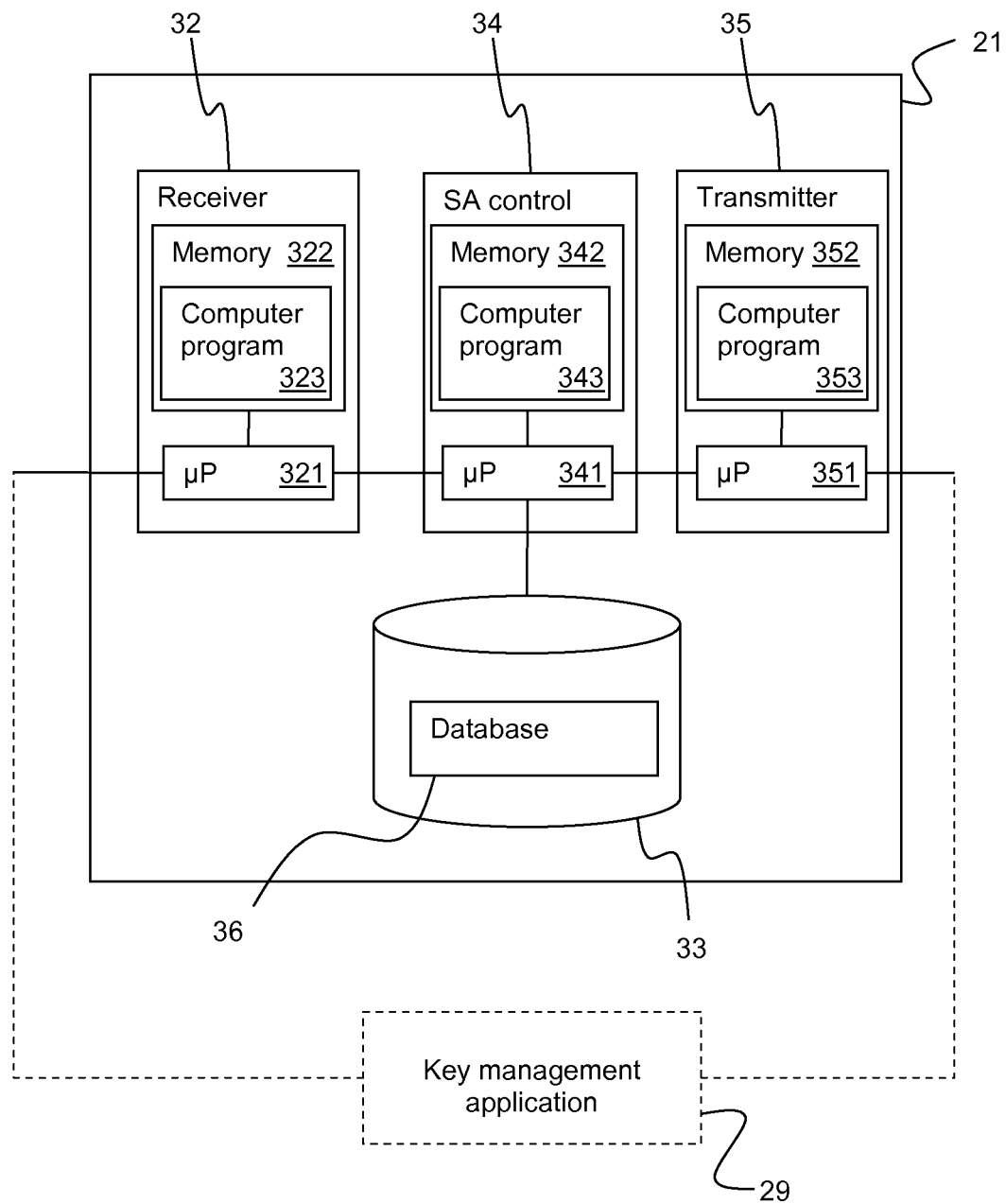
FIG. 3 is a schematic illustration of an alternative architecture of a key engine unit for managing Security Associations.

In practice the key engine unit is likely to be operated by software, and FIG. 3 is an illustration of a key engine unit 31 illustrating how this may be implemented. In this case, the key engine unit again includes a receiver 32, Security Association control module 34 and transmitter 35. Each of the receiver 32, SA control module 34 and transmitter 35 includes a processing unit 321, 341, 351. Each processing unit is associated with a computer program product in the form of a memory 322, 342, 352, e.g. one or more ROM, harddisk, flash memory or EEPROM. The memory 322 associated with the receiver 32 comprises a computer program 323 which can be run by the processing unit 321 to control the receipt of PF_KEY messages from key management applications in the network. The key engine unit also comprises a storage medium 33 on which Security Associations are stored in a SADB 36 separated into domains. The storage medium 33 could again be e.g. a RAM, ROM, hard disk, flash memory or EEPROM, or distributed over several processors in the same way as described above with reference to FIG. 2. The memory 342 associated with the SA control module comprises a computer program 343 which can be run by the processing unit 341, as a result of which the processing unit 343 recognises a sadb_x_domain extension header in incoming PF_KEY messages and ensures that they are applied to Security Associations stored in the correct domain in the SADB 36. The memory 352 associated with the receiver 35 comprises a computer program 353 which can be run by the processing unit 351 to control the transmission of messages back towards the key management applications 29.

It will be appreciated that each processing unit 321, 341, 351 may comprise one or more individual processors. It will further be appreciated that the processing units 321, 341, 351 are shown as separate entities in FIG. 3 to assist understanding, but may be provided as part of a single entity or set of entities providing processing capabilities to the receiver, SA control and/or transmitter. Similarly, the memories 322, 342, 352 may be discrete memories or memory spaces associated with separate processors or may be part of a larger entity. The computer programs 323, 343, 353 may be separate entities, or may be constituent parts of the same computer program, which may be run by separate processors or the same processor.

Storing the Domain ID

As discussed in the introduction, key management applications 29 can insert a Security Association into the SADB by sending a SADB_ADD message to a key engine unit 21, 31. The SADB_UPDATE message allows key management applications to update the stored Security Associations.

Each Security Association must be assigned to a domain ID, which is an attribute of the stored Security Association structure. The default value of the domain ID is the common domain ID.

The domain ID attribute can be set during the insertion (SADB_ADD) or during the update (SADB_UPDATE) operation by using the sadb_x_domain extension header. If the DOMAIN_ALL domain ID is set within the sadb_x_domain extension header of a SADB_ADD or SADB_UPDATE message, the key engine unit 21, 31 returns an error and the message is not processed.

A placeholder for a Security Association can be allocated using the SADB_GETSPI PF_KEY message. The SADB_GETSPI message always allocates a Security Association with the domain ID set to common domain ID. This can be changed later on using the SADB_UPDATE message.

Figure 4:
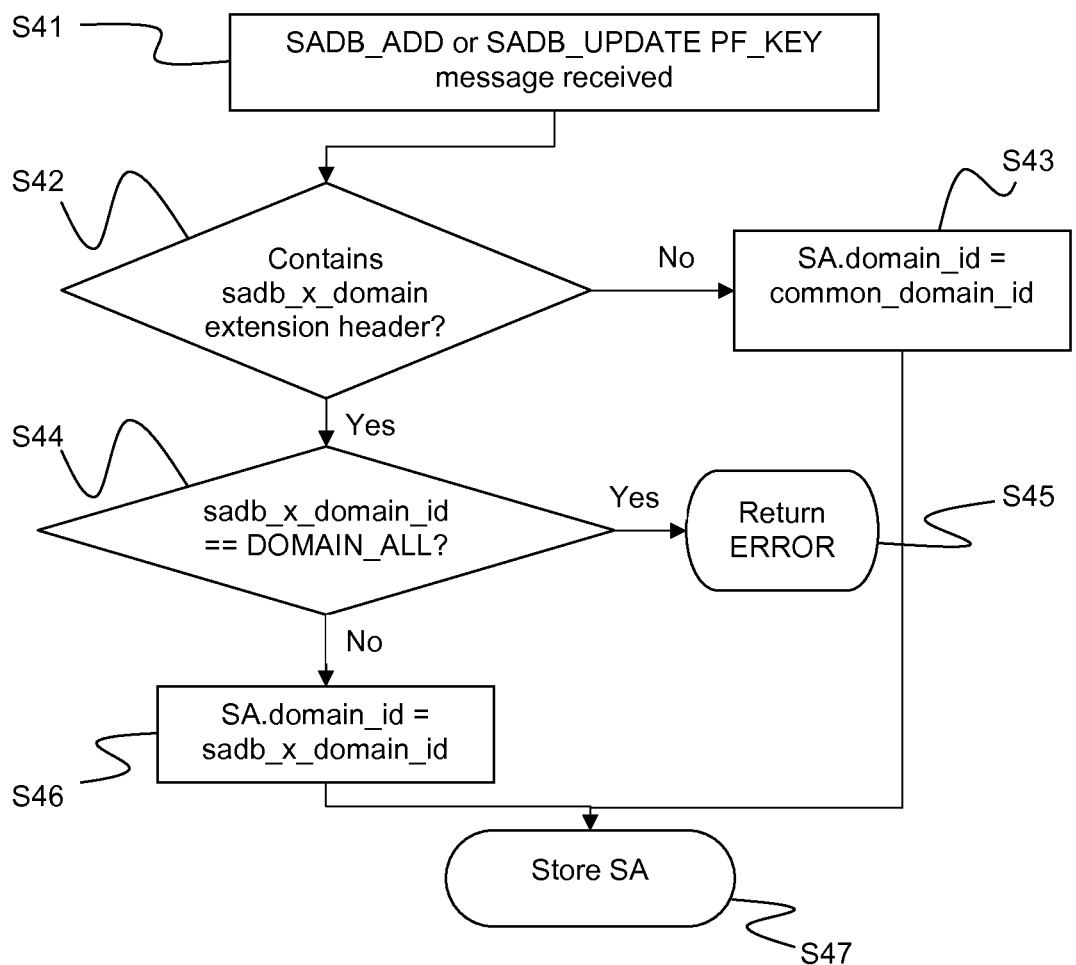
FIG. 4 is a flow chart illustrating the processing of SADB_ADD and SADB_UPDATE PF_KEY messages.

The procedure operated by the key engine unit 21, 31 is illustrated in FIG. 4 as follows:

S41: A SADB_ADD or SADB_UPDATE PF_KEY message is received from a key management application 29 via a receiver 22, 32.

S42: A check is made using the Security Association control 24, 34 to see if the PF_KEY message contains a sadb_x_domain extension header.

S43: If not, the Security Association control 24, 34 assigns the common domain ID to that Security Association and stores it in the database 26, 36 (S47).

S44: If the PF_KEY message does contain a sadb_x_domain extension header, then a check is made by the Security Association control 24, 34 to see if the domain identity contained in the header is DOMAIN_ALL.

S45: If so, an error is returned from the key engine unit 21, 31 towards the key management application 29 via the transmitter 25, 35.

S46: The Security Association control 24, 34 sets the domain identity of the Security Association to the value contained in sadb_x_domain_id contained within the extension header.

S47: The Security Association is stored in the database 26, 36.

Modification of the Effect of the SADB_FLUSH PF_KEY Message

According to RFC 2367, the SADB_FLUSH message can be used for deleting all entries in the SADB. By inserting the sadb_x_domain extension header into the SADB_FLUSH PF_KEY message, a key management application 29 can delete only those entries that belong to a specific domain.

If the application sets the domain ID to DOMAIN_ALL then all entries in the SADB will be deleted, regardless of domain.

If the extension header is not part of the message, or the specified domain ID is the common domain ID, the operation will be performed on the common domain.

Modification of the Effect of the SADB_DUMP PF_KEY Message

According to RFC 2367, the SADB_DUMP message can be used for dumping all entries in the SADB. It is mainly used for testing or debugging reasons and applications must not depend on this message for basic operation.

By inserting the sadb_x_domain extension header into the SADB_DUMP PF_KEY message, key management applications 29 have the possibility of dumping only those entries that belong to a specific domain.

If the key management application sets the domain ID to DOMAIN_ALL then all entries will be dumped.

If the extension header is not part of the message, or the specified domain ID equals to the common domain ID, the operation will be performed on the common domain.

Figure 5:
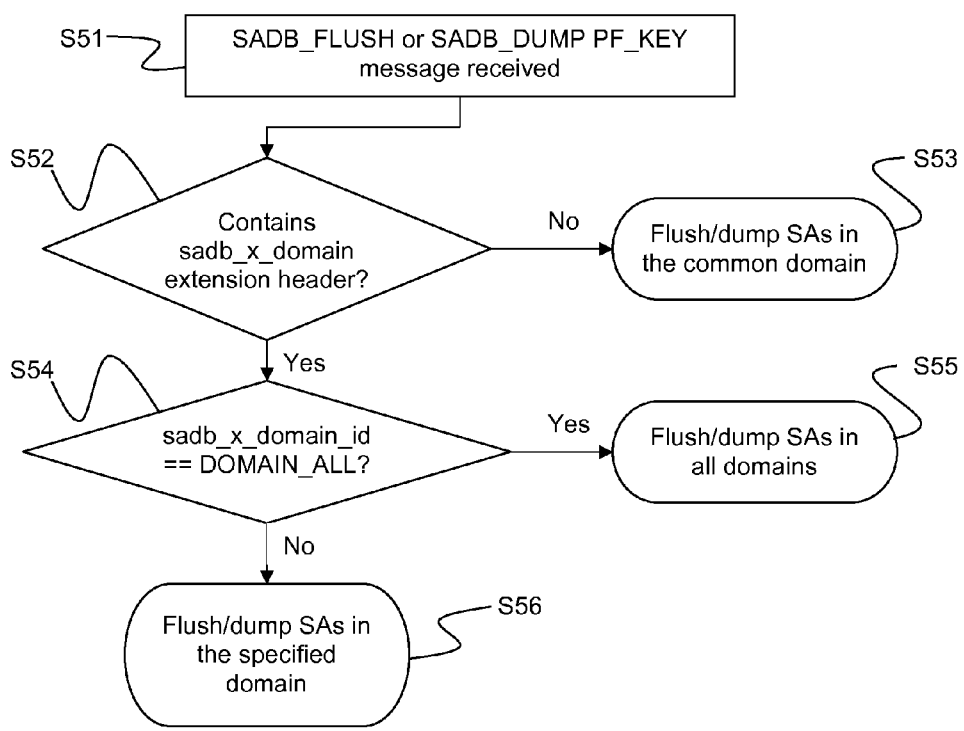
FIG. 5 is a flow chart illustrating the processing of SADB_FLUSH and SADB_DUMP PF_KEY messages.

The procedures described above are illustrated in FIG. 5:

S51: A SADB_FLUSH or SADB_DUMP PF_KEY message is received by the key engine unit 21, 31 from a key management application 29 via the receiver 22, 32.

S52: A check is made by the Security Association control 24, 34 to see if the PF_KEY message contains a sadb_x_domain extension header.

S53: If not, the Security Association control 24, 34 instructs the database 26, 36 to delete or dump the Security Associations in the common domain (depending on the original message).

S54: If the PF_KEY message does contain a sadb_x_domain extension header, then a check is made by the Security Association control 24, 34 to see if the domain identity contained in the header is DOMAIN_ALL.

S55: If so, then all the Security Associations in the SADB (in all domains) are deleted or dumped.

S56: If the sadb_x_domain header contains a specific domain identity, then all the Security Associations in that domain are deleted or dumped.

The method described above extends the SADB management capabilities of the PF_KEY API by allowing the assignment of Security Associations to different domains and by supporting the dumping and flushing of the Security Associations belonging to a specific domain.

If the proposed method is applied in a system, the legacy key management applications do not need to be modified. The applications that are capable of utilizing the functions provided by this method can be co-located with the legacy applications.

It will be appreciated that variations from the above described embodiments may still fall within the scope of the invention, which is defined in the accompanying claims.

The invention claimed is:

1. A key engine unit for managing IPsec Security Associations in an IP network, comprising:
   a receiver configured to receive a PF_KEY message from a key management application in the IP network;
   a non-transitory storage medium configured to store Security Associations in a Security Association Database, the Security Association Database partitioned into discrete domains;
   a transmitter configured to send a response message to the key management application;
   one or more processing circuits, operatively connected to the receiver, transmitter, and non-transitory storage medium, the one or more processing circuits configured to:
      determine whether the received PF_KEY message contains a domain extension header, and, if so:
         use the domain extension header to identify a domain in the Security Association Database;
         apply instructions contained in the PF_KEY message to the identified domain;
   wherein the Security Association Database comprises a common domain;
   wherein the one or more processing circuits are configured to apply the instructions contained in the PF_KEY message to the common domain in response to the domain extension header being absent from the received PF_KEY message.

2. The key engine unit of claim 1:
   wherein the received PF_KEY message is a SADB_ADD or SADB_UPDATE message comprising a new or updated Security Association;
   wherein the one or more processing circuits are configured to store the new or updated Security Association:
      in the domain of the Security Association Database identified in the domain extension header in response to the domain extension header being present in the PF_KEY message;
      in the common domain in response to the domain extension header being absent from the PF_KEY message.

3. The key engine unit of claim 2, wherein the one or more processing circuits are configured, in response to the domain extension header in the PF_KEY message comprising a domain identifier indicating all of the domains in the Security Association Database, to instruct the transmitter to return an error message towards the key management application without storing the Security Association in the Security Association Database.

4. The key engine unit of claim 1, wherein:
   the received PF_KEY message is a SADB_FLUSH message;
   the one or more processing circuits are configured to:
      delete all Security Associations in the domain of the Security Association Database identified in the domain extension header in response to the domain extension header being present in the PF_KEY message;
      delete all Security Associations in the common domain in response to the domain extension header being absent from the PF_KEY message.

5. The key engine unit of claim 4, wherein the one or more processing circuits are configured to, if the domain extension header in the PF_KEY message contains a domain identifier indicating all of the domains in the Security Association Database, carry out the instruction contained in the PF_KEY message for all domains in the Security Association Database.

6. The key engine unit of claim 1, wherein:
the received PF_KEY message is a SADB_DUMP message;
the one or more processing circuits are configured to:
in response to the domain extension header being present in the PF_KEY message, cause the transmitter to send towards the key management application all Security Associations in the domain of the Security Association Database identified in the domain extension header;
in response to the domain extension header being absent from the PF_KEY message, cause the transmitter to send towards the key management application all Security Associations in the common domain.

7. The key engine unit of claim 6, wherein the one or more processing circuits are configured to, if the domain extension header in the PF_KEY message contains a domain identifier indicating all of the domains in the Security Association Database, carry out the instruction contained in the PF_KEY message for all domains in the Security Association Database.

8. The key engine unit of claim 4, wherein each domain in the Security Association Database is used to store the Security Associations for a single key management application.

9. A method of managing IPsec Security Associations in a Security Association Database maintained by a key engine unit in an IP network, the method comprising:
receiving, at the key engine unit, a PF_KEY message from a key management application in the network, the PF_KEY message comprising instructions to the key engine unit and a domain extension header identifying a domain within the Security Association Database;
carrying out the instructions contained in the PF_KEY message for Security Associations in the domain of the Security Association Database indicated by the domain extension header;
wherein the Security Association Database comprises a common domain;
wherein the key engine unit is configured to apply the instructions contained in the PF_KEY message to the common domain in response to the domain extension header being absent from the received PF_KEY message.

10. The method of claim 9:
wherein the PF_KEY message is a SADB_ADD or SADB_UPDATE message including a new or updated Security Association;
further comprising inserting the Security Association into the Security Association database in the domain indicated by the domain extension header.

11. The method of claim 9:
wherein the PF_KEY message is a SADB_FLUSH message;
further comprising deleting all Security Associations contained in the domain indicated by the domain extension header.

12. The method of claim 11, wherein:
the domain extension header comprises an identifier indicating all the domains of the Security Association Database;
wherein the deleting comprises deleting all Security Associations in the Security Association Database.

13. The method of claim 9:
wherein the PF_KEY message is a SADB_DUMP message;
further comprising returning all Security Associations contained in the domain indicated by the domain extension header to the key management application.

14. The method of claim 13, wherein:
the domain extension header comprises an identifier indicating all the domains of the Security Association Database;
wherein the returning comprises returning all Security Associations in the Security Association Database to the key management application.

15. The method of claim 9, wherein the domain extension header is inserted into the PF_KEY message by the key management application.

16. A computer program product stored in a non-transient computer readable medium for controlling a key engine unit, the computer program product comprising software code instructions which, when run on the key engine unit, causes the key engine unit to:
receive, at the key engine unit, a PF_KEY message from a key management application in the network, the PF_KEY message comprising instructions to the key engine unit and a domain extension header identifying a domain within the Security Association Database;
carry out the instructions contained in the PF_KEY message for Security Associations in the domain of the Security Association Database indicated by the domain extension header;
wherein the Security Association Database comprises a common domain;
wherein the key engine unit is configured to apply the instructions contained in the PF_KEY message to the common domain in response to the domain extension header being absent from the received PF_KEY message.

* * * * *